July 10, 1962 J. R. MOOT 3,043,943
FOOD WARMER
Filed Dec. 24, 1959

INVENTOR.
JOHN R. MOOT
BY
Porter, Chittick & Russell
ATTORNEYS

United States Patent Office 3,043,943
Patented July 10, 1962

3,043,943
FOOD WARMER
John R. Moot, Cambridge, Mass., assignor to Cornwall Corporation, Boston, Mass., a corporation of Massachusetts
Filed Dec. 24, 1959, Ser. No. 861,866
4 Claims. (Cl. 219—19)

This invention relates to food warmers, and more particularly to a tray adapted to heat food and dishes containing food to serving temperature.

A major object of my invention is to provide a food warming tray which is, at one and the same time, light, durable, thermally efficient, water immersible, and inexpensive to manufacture.

In the preferred embodiment of my invention, I accomplish this and other objects of my invention by arranging a tray surface and heating element within a frame defining a flat, horizontally disposed cavity. With these elements in place within the frame, I introduce an expanding polyurethane foam under the heating element. This foam completely fills the cavity within the frame, and upon curing it holds the tray surface and heating element in place. In addition, the foam serves as both a thermal and electrical insulator, and also becomes an important structural part of the tray rendering it essentially rigid although light. The foam also seals off the frame edges and renders the entire tray water immersible. Thus it is a major feature of my invention that the foam serves the quadruple function of (a) providing structural rigidity without significant increase of weight, (b) providing heat insulation, (c) providing a means for holding the elements of the tray together both during manufacture and during later use, and (d) rendering the entire tray water immersible.

Other objects and many of the attendant advantages of this invention will be readily appreciated as the same becomes better understood by reference to the following detailed description when considered in connection with the accompanying drawings, wherein.

Figure 1:
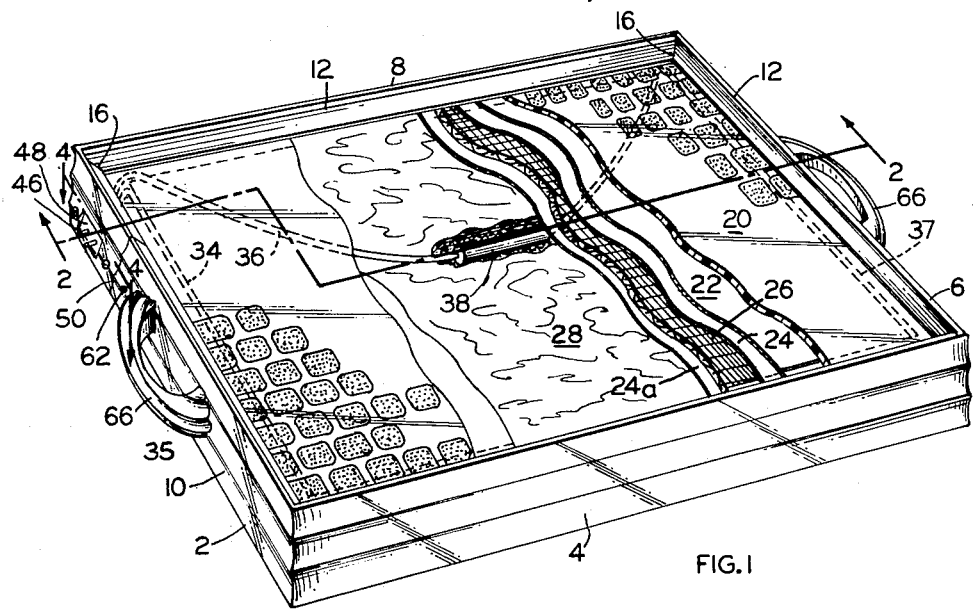
FIG. 1 is a perspective view of one form of the invention with certain parts broken away to show the internal construction.
Figure 2:
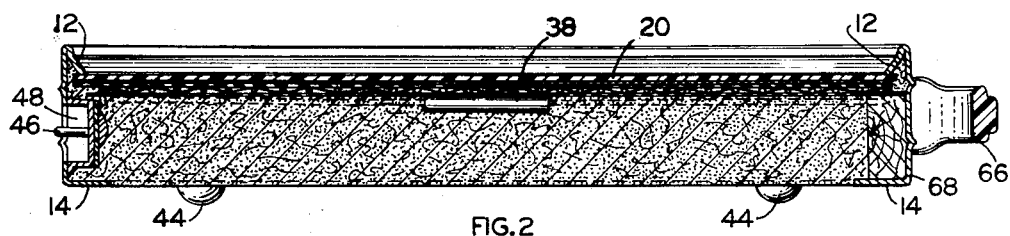
FIG. 2 is a sectional view in elevation taken along the line 2—2 of FIG. 1.
Figure 3:
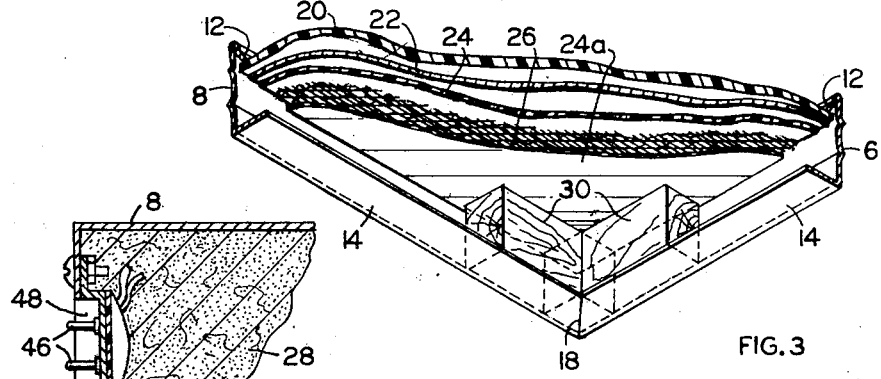
FIG. 3 is a fragmentary view from below of one corner of the tray during the stage of its manufacture immediately prior to the addition of the heat insulation material.
Figure 4:
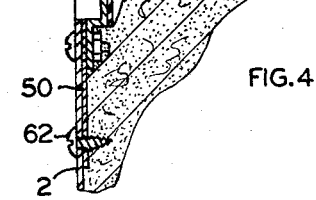
FIG. 4 is a fragmentary sectional view taken along line 3—3 of FIG. 1.

FIG. 1 shows a tray comprising a frame made by bending a single elongated metal bar 2 into a generally rectangular form defined by sides 4, 6, 8 and 10, each provided with a sloping top flange 12 and a horizontal bottom flange 14. The ends of flanges 14 are beveled to form miter joints 18. The ends of flanges 12 are beveled to form oblique miter joints 16 which serve to prevent overflow of spilled fluids onto the floor, etc.

Contained within the frame in sandwiched or stacked relation are a top dish-supporting member 20, a heat-diffusing member 22, an electrical heating unit comprising an envelope 24 and 24a, a heating element 26, and a heat insulator 28. Blocks 30, wedged against bottom flanges 14, press dish-supporting member 20, heat-diffusing member 22, electrical insulation envelopes 24 and 24a, and heating element 26 tightly against one another and against top flanges 12.

For the top surface member 20, it is necessary to use a material that will conduct heat without softening, cracking, or buckling. Additionally, it is advantageous, if not necessary, to utilize a material that will not mar, scar, or scratch easily, will not deteriorate under harsh soaps, detergents, foods, greases, or acids, and which can be finished in various colors and decorative patterns. For this purpose, Formica-type plastic materials have been found suitable; also decorative metals and porcelain enameled steel are suitable.

The heat-diffusing member 22 preferably takes the form of aluminum foil. It is used only with non-conducting top surfaces. The aluminum foil is preferably, though not necessarily, attached to the underside of the top surface member 20 by means of an adhesive or a pressure-sensitive adhesive tape. This keeps the foil in place during assembly. The function of aluminum foil 22 is to conduct heat across the top surface member 20 and actuate a thermostat 38.

The heating element 26 comprises a sheet of glass cloth coated on one side with a carbon suspension. The glass cloth is made from glass yarns of the type sold by Owens-Corning Fiberglas Corp. under the trademark Fiberglas. The carbon coating has a high electrical resistance and heats up when connected to a source of electrical power. The carbon coating is not shown separately in the drawings for the reason that it is so thin in comparison to the glass cloth as to be distinguishable only by its color. However, it is to be understood that the heating element 26 is positioned with its carbon side up, facing the aluminum foil.

Current is supplied to the heating element 26 by means of two leads 34 and 36 which are conventional copper conductors covered with a suitable heat-resistant insulation. One end of each lead is scraped bare of insulation for a distance about equal to the width of the heating element 26, and these bare ends are attached to the carbon-coated surface of the heating element at opposite edges thereof (as shown at 35 and 37 in FIG. 1) by stitching with a suitable heat-resistant thread, by a conductive heat-resistant cement, or by other suitable means. Connected in lead 36 is a thermostat unit 38 of any suitable construction. The thermostat may be of the fixed or variable type. Regardless of type, it has been found that it should be capable of interrupting current flow when its temperature exceeds approximately 250° F. and of restoring current flow when its temperature falls below approximately 240° F. With this thermostat temperature the tray surface is maintained at approximately 200° F. The lead 36 is bent under the heating element 26 so as to locate the thermostat substantially at the center of the heating element and bent back again toward lead 34.

Blocks 30 may be made of wood, cardboard, or the like and are inserted between the dish-supporting surface 20 and its associated parts on the one hand and the bottom flanges 14 on the other, thereby holding the dish-supporting surface 20 and associated parts together while the foam cures as described below.

The heat insulator 28 takes the form of foam-forming polyurethane materials, which are foamed in place and expand throughout the unoccupied area of the tray, bonding firmly to the various elements therein and curing rapidly. Said materials have the advantage of being relatively light in weight while at the same time relatively rigid, so that they render the whole assembly strong. While the foam is forming the bottom of the tray is pressed tightly against a hard smooth surface so that the foam-forming material will set with a smooth bottom surface which is well adapted to serve as the bottom surface of the tray. Although the foam expands readily into all open spaces within the tray, it will not leak out past the flanges 12 onto the dish-supporting member 20 or past the flanges 14, because of the inability of the foam-forming material to penetrate great distances through narrow constrictions.

The bottom of the foam may be engaged and supported at its edges by flanges 14. However, the foam adheres so strongly to the elements of the unit when foamed in place, that these flanges may be omitted. In this connection, it is important to employ an essentially closed cell type of foam in order to render the tray water immersible and to seal the seams against water penetration.

Attached to the underside of the tray adjacent to its four corners are four plastic feet 44 which support the tray and prevent the bottom of the tray from coming into contact with the table or other furniture on which the tray may be placed while in use.

Leads 34 and 36 are connected to a male-type electrical connector 46. The latter is positioned in an opening 48 in one end of the bar 2, close to where its ends form a butt joint 50. The connector 46 has oppositely disposed perforated ears 52 and 54 which are secured to the frame by screws 56 and nuts 58. A flat bracket plate 60 is mounted on the screw 56 nearest the butt joint 50. The bracket plate extends behind the joint and is secured to the other end of the frame by a sheet metal screw 62. Suitable handles 66 are attached to opposite sides of the frame by screws 68.

The flanges 12 and 14 cooperate with the foam 28 to hold the various elements in tight sandwiched relation and prevent them from shifting. In this connection, it is to be noted that apart from leads 34 and 36, the only members which engage the frame are the top plastic member 20, the blocks 30, and the foam 28. Moreover, the top element 20 does not touch the side walls of the frame. This element is smaller in width and length than the frame, but is large enough to be engaged by flanges 12 and 14. The primary reason for making the top member 20 and associated elements smaller than the frame is to facilitate assembly of the tray.

When the tray is coupled to a source of power by means of connector 46, the heating element 26 will give off heat. The insulator 28 will insulate the surface on which the tray rests from the heating element, so that most of the heat will be directed upward. The aluminum foil 22 will diffuse the heat evenly throughout the top plastic member 20. The latter in turn will heat a dish or other receptacle positioned thereon so as to keep warm the contents of said dish or receptacle.

It should be noted that inasmuch as the foam-forming polyurethane materials 28 have electrical as well as heat insulation properties it is not necessary to take the double precaution of extending the electrical insulation 24a under the heating element 26. That is, the plastic foam 28 can serve the additional function of providing electrical insulation for the lower surface of heating element 26, and electrical insulator 24a can be omitted.

In practicing this invention it is preferred to fabricate the frame from aluminum, but other materials may be used as well. Similarly, handles 66 may be made from plastic, wood or metal, as desired.

Obviously many modifications and variations of the present invention are possible in the light of the above teachings. In particular, in one modification, I employ a single stamping for the side walls and tray surface. Therefore, it is to be understood that the invention is not confined to the details of the construction and arrangement of parts specifically described above, but rather is limited only as set forth in the appended claims.

Having thus described and disclosed a preferred embodiment of my invention, what I claim as new and desire to secure by Letters Patent of the United States is:

1. A food warmer comprising: a rectangular frame element defining a flat horizontal cavity; an inwardly projecting flange around the bottom of said frame element; an inwardly and downwardly projecting flange around the top of said frame element; a food supporting member of slightly less lateral and longitudinal dimension than said frame element; a heating member comprising, a carbon coated glass web positioned in an electrical insulating envelope; means for supplying an electrical current to said heating member; thermostat means for controlling the amount of heat given off by said heating member; substantially rigid plastic foam foamed and cured in place to support said food supporting member, heating member, means for supplying current to said heating member, and said thermostat means all in a horizontal sandwiched parallel relationship upwardly against said inwardly and downwardly extending top flange; and means including a male electrical connector positioned through said frame element for connecting said food warmer to an external supply of electrical current.

2. A food warmer comprising: a rectangular frame defining a flat horizontal cavity; inwardly projecting flanges around the upper and lower edges of said frame element; a food supporting surface within said frame in contact with the lower surface of the upper flange; a heating member; means for supplying an electrical current to said heating member; thermostat means for controlling the amount of heat given off by said heating member; substantially rigid plastic foam foamed and cured in place to support said food supporting member, heating member, means for supplying current to said heating member, and said thermostat means all in a horizontal sandwiched parallel relationship; and means for connecting said food warmer to an external supply of electrical current.

3. A food warmer comprising: a rectangular frame defining a flat horizontal cavity; inwardly projecting flanges around the upper and lower edges of said frame element; a food supporting surface within said frame in contact with the lower surface of the upper flange; a heating member consisting of a carbon coated glass web positioned in an electrical insulating element; means for supplying an electrical current to said heating member; thermostat means for controlling the amount of heat given off by said heating member; substantially rigid plastic foam foamed and cured in place to support said food supporting member, heating member, means for supplying current to said heating member, and said thermostat means all in a horizontal sandwiched parallel relationship; and means for connecting said food warmer to an external supply of electrical current.

4. A food warmer comprising: a rectangular frame defining a flat horizontal cavity; inwardly projecting flanges around the upper and lower edges of said frame element; a food supporting surface within said frame in contact with the lower surface of the upper flange; a heating member; means for suplying an electrical current to said heating member; thermostat means for controlling the amount of heat given off by said heating member; substantially rigid plastic foam foamed and cured in place to support said food supporting member, heating member, means for supplying current to said heating member, and said thermostat means all in a horizontal sandwiched parallel relationship upwardly against said inwardly extending upper flange and means including an electrical connector positioned through said frame element for connecting said food warmer to an external supply of electrical current.

References Cited in the file of this patent

UNITED STATES PATENTS

| | | |
|---|---|---|
| 1,087,593 | Kuhn | Feb. 17, 1914 |
| 2,404,736 | Marick | July 23, 1943 |
| 2,518,015 | Jeffrey | Aug. 8, 1950 |
| 2,572,163 | Lamb | Oct. 23, 1951 |
| 2,612,585 | McCann | Sept. 30, 1952 |
| 2,613,308 | LaMirand | Oct. 7, 1952 |
| 2,715,674 | Abbott et al. | Aug. 16, 1955 |
| 2,859,322 | Glazier et al. | Nov. 4, 1958 |
| 2,889,445 | Wolf | June 2, 1959 |

(Other references on following page)

UNITED STATES PATENTS 2,915,397    Telkes _____ Dec. 1, 1959

OTHER REFERENCES

Van Boskirk: "Modern Plastic" February 1957 ("Plastiscope," pp. 235–252).

Thielman: "Electrical Manufacturing" January 1958 ("Foamed Plastics for Structural Functions in Electronic Equipment," pp. 67–73).

Frensdorff: "Rubber Age" August 1958 ("Polyurethane Foams,") pp. 812–818).